United States Patent Office 3,463,729
Patented Aug. 26, 1969

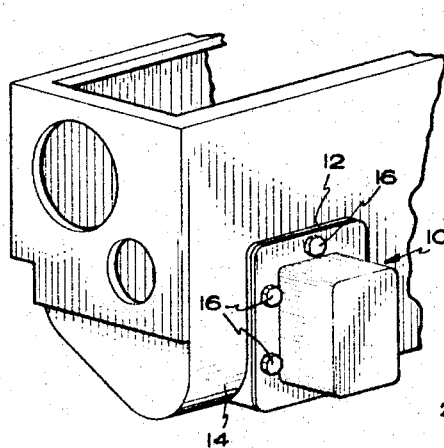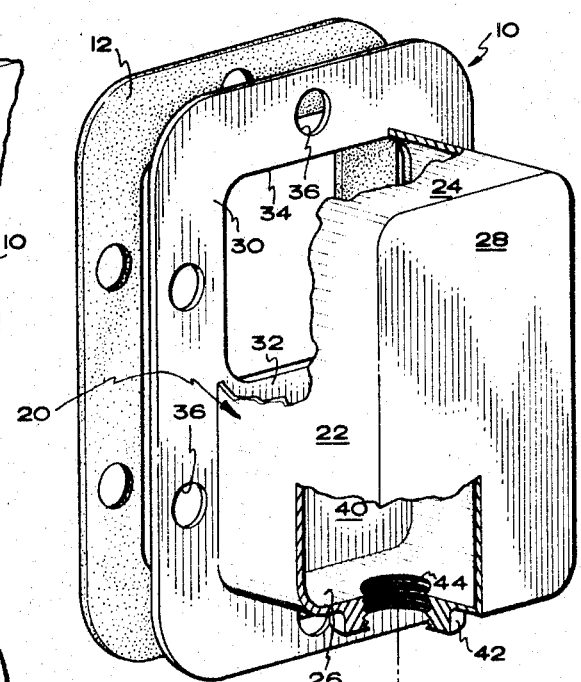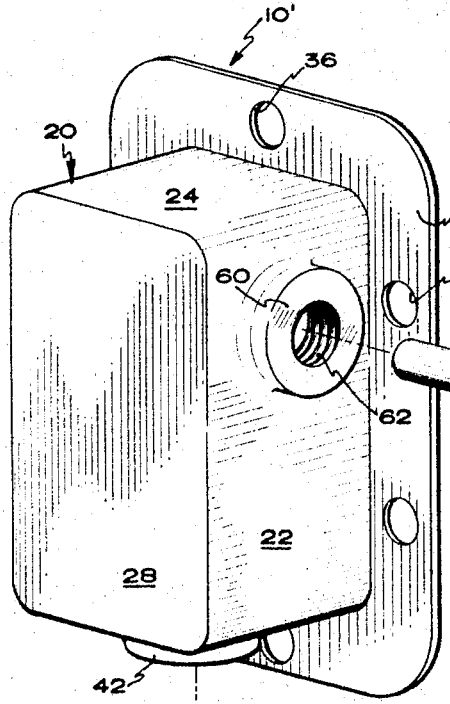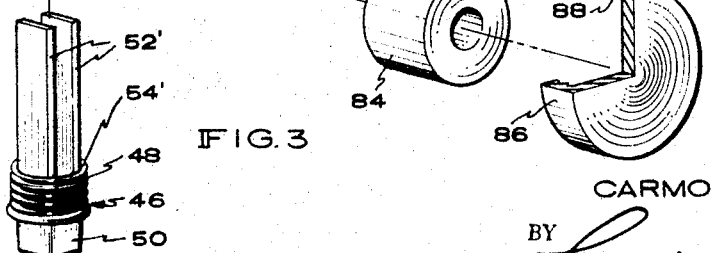

3,463,729
MAGNETIC FILTRATION OF
TRANSMISSION FLUID
Carmon J. Bean, 413 N. 1st W.,
Salt Lake City, Utah 84103
Filed Apr. 17, 1967, Ser. No. 631,288
Int. Cl. B01d 35/06; B03c 1/30
U.S. Cl. 210—42                    8 Claims

ABSTRACT OF THE DISCLOSURE

A magnetic filtration system comprising an auxiliary housing, with one or more internally exposed magnets, adapted to be attached in sealed relation to the side of a truck or like transmission casing for receiving and magnetically purging displaced transmission fluid of suspended pieces of metal worn from the transmission gears through use.

---

This invention generally relates to the cartridgeless filtering of metal cuttings from fluid within a transmission. More particularly, this invention relates to a system including method and apparatus, for removing such metal cuttings from transmission fluid using an auxiliary housing attached to the transmission casing solely by magnetic attraction as the fluid is caused by normal transmission operation to move in and out of the auxiliary housing.

Prior known proposals for cleansing transmission fluid of suspended metal particles, brought into being by wear of one transmission component against another, have consisted of supplemental cartridge-type filters. Disadvantageously, such filters clog easily and, therefore, become ineffectual after only a relatively short period of use and are also hard to service.

Accordingly, it is a primary object of this invention to provide a unique system, including method and apparatus, for magnetically removing suspended metal pieces or cuttings from the fluid in a transmission so as to avoid clogging of the filtering action by collected filtrate while accommodating easy servicing of the apparatus.

Another important object is the provision of a novel auxiliary magnetic filtration assembly, for attachment adjacent an existing side port in the transmission, to efficiently purge fluid in the transmission of metal particles by attracting and holding the particles as the transmission fluid is displaced by normal transmission rotation into the vicinity of the attached assembly.

A further significant object of this invention is the provision of a novel auxiliary magnetic filtration unit utilizing a low-voltage electromagnet for purging fluid in a transmission of metal cuttings.

A further and no less significant object of this invention is the provision of a novel auxiliary magnetic filtration unit which requires no substantial disassembly to clean, and which incurs no appreciable loss of transmission fluid during cleaning.

These and other objects and features of the present invention will become more fully apparent from the following description and appended claims taken in conjunction with the accompanying drawings wherein:

FIGURE 1 is a fragmentary perspective showing a presently preferred magnetic filter assembly embodiment of this invention attached to and in sealed relation with a schematically depicted truck or like transmission casing so as to be in fluid communication with a side port in the casing;

FIGURE 2 is an exploded perspective of one presently preferred magnetic filter assembly embodiment of this invention, with parts broken away for clarity of illustration; and FIGURE 3 is an exploded perspective of another presently preferred magnetic filter assembly embodiment, according to the present invention.

Reference is now made specifically to the drawings wherein like numerals are used to designate like parts throughout. FIGURE 1 shows in fragmentary perspective the external appearance of one presently preferred magnetic filtration assembly 10 attached by an array of cab screws 16 to a truck or like transmission 14 over an existing, normally plate-covered power take-off port (not shown). An interposed gasket 12 seals the magnetic filtration assembly 10 in the illustrated position. The truck or like transmission casing 14 is shown fragmentarily with moving transmission parts not illustrated for simplicity of presentation.

The magnetic filtration assembly 10 is shown in enlarged exploded perspective in FIGURE 2, as is the properly apertured gasket 12. The assembly 10 comprises a hollow auxiliary housing, generally designated 20, fabricated preferably of thin-gage metal formed by use of casting, stamping, welding or like techniques. The housing 20 comprises a closed exposed end 28; a central enclosing portion comprising opposed side walls 22, top wall 24 and bottom wall 26; and a second end wall 32. The end walls 28 and 30, along with the side walls 22, the top wall 24 and the bottom wall 26, form an externally fluid-tight enclosure, with exception of the fluid communication provided with the interior of the transmission accommodated through the relatively large port 34.

End wall 32 terminates in an enlarged, peripherally exposed flange 30, having suitably sized and located holes 36 for the purpose of accommodating passage therethrough of cap screws 16 (FIGURE 1). The end wall 32 also provides a relatively elevated, comparatively large opening 34 to accommodate both influent and effluent travel of transmission fluid into and out of the hollow interior or reservoir 40 of the housing 20, during normal rotation of the transmission components.

The port 34 occupies a relatively high disposition so as to be situated above the level of the transmission fluid in the casing 14, when the transmission is idle. Thus, the lower portion of the end wall 32, during idle periods, forms a barrier to entrance of transmission fluid into the reservoir or supplemental sump 40. On the other hand, such fluid is freely thrown into a reservoir through the port 34 during and by reason of the operation of the transmission and concurrently therewith such fluid in excess of the fluid retention capability of the reservoir 40 will ebb out of the housing 20 back into the casing 14.

The bottom wall 26 of the housing 20 is fabricated so as to possess a bottom boss 42, having a centrically disposed threaded bore 44. During operation, a threaded plug 46 is threadedly secured in the bore 44 in fluid sealed relation, as by use of a wrench (not shown) upon opposed wrench surfaces 50.

A vertically upstanding permanent magnet 52, integrally secured to the plug 46, adjacent the numeral 54, will thus be disposed centrally within the reservoir 40 in spaced relation to the surrounding housing walls.

During prototype operation, it has been found that within a relatively brief period of time, using the apparatus 10, essentially all of the fluid in a truck transmission can be generally purged of small metal particles, cuttings and fragments caused by transmission wear. No moving parts are required and the metal fragments are attracted toward and collected along the surface of the magnet 52 which preferably, in the assembled position, will project to a horizontal elevation somewhat above the bottom edge of the opening 34. Thus, all the fluid which initially fills the reservoir 40 and subsequent influence fluid will come within the range of magnetic influence of the permanent magnet 52 and metal particles suspended in the fluid will migrate to the exposed surfaces of the magnet.

No clogging results using this technique and moreover, no appreciable investment of time or loss in transmission fluid occurs when the unit 10 is cleaned. All that is necessary to service or clean the unit 10 is the unthreading and removal of the plug 46 from the threaded bore 44 followed by the wiping or like removal of the collected metal particles from the surface of the magnet 52. Only the small quantity of transmission fluid retained within the reservoir 40 will be lost through the open bore 44. Thereafter, the magnet and plug 46 are repositioned with the plug, again being secured in the threaded bore 44 in fluid-tight relation.

Specific reference is now made to FIGURE 3, which shows a second presently preferred magnetic filtration assembly 10'. Some of the component parts of the assembly 10' are identical or substantially identical to the previously-described component parts of the assembly 10 and are so numbered and will not hereafter again be described. A relatively short magnet 52' is shown as being used in place of the previously-described permanent magnet 52. Magnet 52 is disposed in integral upstanding relation with the plug 46, which, as explained, is adapted to be threadedly received in fluid-tight relation by the bore 44.

Unlike the housing of FIGURE 2, the housing of FIGURE 3 is provided with a side boss 60, which has a centrally disposed threaded bore 62, the axis of which is generally horizontal and is disposed at an elevation somewhat above the lower edge of the opening 34.

A low-voltage electromagnet assembly, generally designated 70, is adapted to be received in fluid-tight relation by the threaded bore 62. Specifically, the electromagnet assembly 70 comprises a generally cylindrically-shaped, hollow body 74 having a reduced-diameter, threaded portion 72 adapted to engage the threaded bore 62 and a threaded portion 82 of intermediately reduced diameter situated at the opposite end of the body 74. Thus, an open cylindrical bore 80 is provided adjacent the threads 82. An elongated core 76, in form of a rod, is received in press-fit relation within the bore 78 of the body 74. The core rod 76 is of sufficient length so as to extend coaxially and coextensive along the entire length of the body 74. The rod 76 also extends, exterior of the body 74 away from the threaded portion 72 for a distance just slightly less than the width of the housing 20.

A coil 84, of conventional design, is concentrically interposed between the core rod 76 and the body 74 within the cyindrical bore 80 so that the core leads 90 and 92 extend through suitably sized and placed side bores 94 and 96 in the body 74. Although a number of coils would be satisfactory, two suitable coils which may be used are Coil No. V5-627-F24, manufactured by Skinner Electric Valves of New Britain, Conn., and Coil No. 92-870-4, manufactured by ASCO Valves, Automatic Switch Company, Florham Park, N.J. By using either of the two mentioned coils, the coil leads 90 and 92 may be suitably electrically connected to the ignition switch of the 12-volt truck or like ignition system for operation of the electromagnet assembly 70.

The coil 84 is held within the hollow interior of the body 74 by use of a cap 86 threaded at 88 to be firmly received at the threaded portion 82 of the body 74.

With the magnetic filtration assembly 10' situated in assembled position and in operative relation upon the side of the truck or like transmission, energizing of the truck ignition system will in turn energize the core rod 76. Thus, hydraulic fluid initially filling the reservoir 40 and fluid introduced into the housing 20 thereafter through the opening 34 will be brought within the electromagnetic influence of the core rod 76. In this way, metal particles suspended in the transmission fluid will be attracted and collected along the surface of the core rod 76 during transmission operation. Experience has shown that in this way, the transmission fluid returning to the casing 14 from the housing will be generally purged of metal particles and the entire body of fluid in the transmission will be generally purged in this manner within a relatively short period of time.

Subsequently, when the ignition system is de-energized as by turning off the ignition key, the core rod 76 will likewise be de-energized. Thus, the collected metal particles will, due to force of gravity, fall through the static pool of fluid remaining within the reservoir 40 behind the closing structure of the end wall 32. As these descending metal particles come within the realm of magnetic influence of the magnet 52', the metal particles will be attracted by and collected along the surface of the magnet 52'. Subsequently, the magnet 52', the collected metal particles on the magnet, along with the integral plug 46, can be jointly removed by unthreading the plug from the threaded bore 44. The metal particles may thereafter be wiped or otherwise removed from the surface of the permanent magnet 52'. Only the small quantity of transmission fluid disposed within the reservoir 40 is lost during such a cleansing process and the plug and integral permanent magnet 52' may be thereafter returned to the described sealed operating position for further use.

If desired, the permanent magnet 52' may be eliminated from the plug 46. Thus, upon de-energizing of the electromagnet 70, the collected metal particles will fall under force of gravity through the fluid remaining within the reservoir and come to rest at random upon the bottom 26 of the housing. Subsequent removal of the plug 46 will accommodate emptying fluid in the reservoir 40 and, consequently, the discharging of most of such metal particles from the housing through the bore 44. By providing the interior surface of the housing bottom with a taper which converges at the bore 44, such discharge of metal particles will be enhanced.

With the foregoing in mind, it should now be appreciated that embodiments of the present invention provide uniquely for magnetic filtration of a transmission fluid, so as to efficiently purge the fluid of metal particles. Clogging problems are totally obviated, and servicing may be easily accomplished in a very short period of time without material loss of transmission fluid.

The invention may be embodied in other specific forms without departing from the spirit or essential characteristics thereof. The present embodiments are, therefore, to be considered in all respect as illustrative and not restrictive.

What is claimed and desired to be secured by United States Letters Patent is:

1. In a method of purging transmission fluid of small metal cuttings and the like comprising providing a supplemental sump by situating an auxiliary housing in fluid communication with the interior of an encased motor-driven transmission, throwing transmission fluid into the auxiliary housing through opening structure common to the transmission and the auxiliary housing and disposed at the upper portion of the auxiliary housing by action of the transmission during operation, attracting and holding the metal cuttings during operation to a core of an electromagnet exposed within the auxiliary housing above the bottom of the sump while back-flowing the fluid from the auxiliary housing to the transmission through said common opening structure, releasing the metal cuttings from the electromagnet when the electromagnet is de-energized at cessation of operation and thereafter attracting and holding the released metal cuttings to a permanent magnet exposed within the supplemental sump of the auxiliary housing below the electromagnet.

2. A method as defined in claim 1 wherein said first attracting and holding step comprises powering the electromagnet by use of the electrical system of the motor.

3. In a method as defined in claim 1 further comprising the step of removing the permanent magnet and held metal cuttings from attached relation with the auxiliary housing, separating the cuttings from the permanent magnet and re-attaching the permanent magnet relative to the auxiliary housing in said exposed disposition to purge the auxiliary housing of the collected metal cuttings.

4. In a method as defined in claim 3 wherein said removing step comprises unthreading a plug which is integral with the permanent magnet from the bottom of the supplemental sump of the auxiliary housing by application of external force whereby the collected metal cuttings are withdrawn with the permanent magnet and only residual fluid trapped in the supplemental sump is lost.

5. A magnetic filter assembly adapted to be secured along the exterior of a transmission casing adjacent a port in the transmission casing in sealed relationship therewith, the filter assembly comprising a filter housing including means for fastening the housing to the casing, an interior chamber in said housing closed about substantially the entire periphery thereof but comprising elevated opening means constructed and arranged to be situated in fluid communication with said port upon securement of the assembly to the transmission casing, electromagnetic means comprising a core member removably disposed at least in part within the interior chamber and electrical coil structure located exterior of the filter housing, at least part of the core member being located adjacent said opening means to attract and hold metal fragments carried by fluid into the filter housing when the coil is energized so that fluid returning to the transmission casing will be generally purged of metal fragments, and permanent magnetic means disposed below the core member in the interior chamber to attract the metal fragments when the coil is de-energized and the fragments fall from the core member.

6. An assembly as defined in claim 5 wherein the permanent magnetic means is integrally joined to an externally accessible plug, the plug and permanent magnetic means being releasably associated with the filter housing for complete removal of the plug, the permanent magnetic means and the held metal fragments and subsequent replacement of the plug and permanent magnetic means.

7. An assembly as defined in claim 5 wherein said electromagnetic means comprise means connecting the coil structure to a low-voltage power soure means.

8. An assembly as defined in claim 5 wherein said fluid communication to and from the filter housing occurs solely through the elevated opening means which occupies only the upper part of one wall of the filter housing such that the lower part of the filter housing comprises sump structure which contains a static pool of fluid below the opening means.

References Cited

UNITED STATES PATENTS

| | | | |
|---|---|---|---|
| 1,281,842 | 10/1918 | Rosnick et al. | 210—222 X |
| 1,778,910 | 10/1930 | Niven | 210—223 |
| 2,345,029 | 3/1944 | Brooks | 210—222 X |
| 2,392,624 | 1/1946 | Tunis | 210—223 |
| 2,462,819 | 2/1949 | Trail | 210—168 X |
| 2,622,699 | 12/1952 | Mills | 210—222 X |
| 2,677,440 | 5/1954 | Willis | 210—222 X |
| 2,755,932 | 7/1956 | Cohn | 210—222 |

REUBEN FRIEDMAN, Primary Examiner

W. S. BRADBURY, Assistant Examiner

U.S. Cl. X.R.

210—168, 222